(12) United States Patent
Chang et al.

(10) Patent No.: US 9,703,680 B1
(45) Date of Patent: Jul. 11, 2017

(54) SYSTEM AND METHOD FOR AUTOMATIC SOFTWARE DEVELOPMENT KIT CONFIGURATION AND DISTRIBUTION

(71) Applicant: Google Inc., Mountain View, CA (US)

(72) Inventors: Wayne Chang, Boston, MA (US); Jeffrey Hall Seibert, Jr., Cambridge, MA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/179,104

(22) Filed: Feb. 12, 2014

Related U.S. Application Data

(63) Continuation-in-part of application No. 13/567,262, filed on Aug. 6, 2012, now Pat. No. 9,087,154, which is a continuation-in-part of application No. 13/426,493, filed on Mar. 21, 2012, now Pat. No. 8,863,086, which is a continuation-in-part of application No. 13/323,166, filed on Dec. 12, 2011, now Pat. No. 9,262,250.

(60) Provisional application No. 61/763,638, filed on Feb. 12, 2013.

(51) Int. Cl.
*G06F 9/44* (2006.01)
*G06F 9/445* (2006.01)
*G06F 11/36* (2006.01)

(52) U.S. Cl.
CPC ............ *G06F 11/3664* (2013.01); *G06F 8/60* (2013.01); *G06F 8/65* (2013.01); *G06F 8/61* (2013.01); *G06F 8/63* (2013.01); *G06F 8/68* (2013.01)

(58) Field of Classification Search
CPC .. G06F 11/323; G06F 11/362; G06F 11/3636; G06F 11/3664; G06F 11/3672; G06F 11/3684; G06F 11/3688; G06F 11/0766; G06F 11/0769; G06F 11/0775; G06F 11/0778; G06F 11/0784; G06F 11/0787; G06F 8/60; G06F 8/61; G06F 8/63; G06F 8/65; G06F 8/68
USPC .......................... 717/124, 125, 127, 168–178
See application file for complete search history.

(56) References Cited

U.S. PATENT DOCUMENTS

| | | | |
|---|---|---|---|
| 3,698,009 A | 10/1972 | Barbier | |
| 6,009,274 A * | 12/1999 | Fletcher et al. | ............... 717/173 |
| 6,237,137 B1 | 5/2001 | Beelitz | |
| 6,247,149 B1 | 6/2001 | Falls et al. | |
| 6,282,711 B1 * | 8/2001 | Halpern et al. | ............... 717/175 |
| 6,490,723 B1 * | 12/2002 | Bearden | ................... G06F 8/61 |
| | | | 717/169 |
| 6,813,707 B1 | 11/2004 | Batcher | |

(Continued)

OTHER PUBLICATIONS

Server (computing), Wikipedia, Nov. 24, 2010, last retrieved from en.wikipedia.org/w/index.php?title=Server_(computing) &oldid=398616823, last retrieved Sep. 22, 2014.*

(Continued)

*Primary Examiner* — Wei Zhen
*Assistant Examiner* — Andrew M Lyons
(74) *Attorney, Agent, or Firm* — Fish & Richardson P.C.

(57) ABSTRACT

A developer analytic module executing on an integrated development environment provides location tracing of a software development toolkit and automatic updates of the SDK. The developer analytic module further provides a user interface that enables a developer to select one or more functional modules to be included in a SDK to be installed at the developer's IDE.

20 Claims, 8 Drawing Sheets

(56) References Cited

U.S. PATENT DOCUMENTS

| | | | |
|---|---|---|---|
| 7,043,715 B1* | 5/2006 | Bauer | G06F 9/44505 |
| | | | 717/107 |
| 7,127,705 B2* | 10/2006 | Christfort | G06F 8/20 |
| | | | 707/999.004 |
| 7,143,395 B2 | 11/2006 | Applin et al. | |
| 7,180,531 B2 | 2/2007 | Gery et al. | |
| 7,447,942 B2 | 11/2008 | Chen et al. | |
| 7,484,220 B2 | 1/2009 | Kelley et al. | |
| 8,219,649 B2 | 7/2012 | Ball | |
| 8,230,113 B2 | 7/2012 | Birze et al. | |
| 8,316,343 B2* | 11/2012 | Birze | G05B 19/042 |
| | | | 717/100 |
| 8,433,687 B1 | 4/2013 | Pydi | |
| 8,464,223 B2 | 6/2013 | Choi et al. | |
| 8,516,446 B2 | 8/2013 | Williams et al. | |
| 8,533,678 B2 | 9/2013 | Halter et al. | |
| 8,533,844 B2 | 9/2013 | Mahaffey et al. | |
| 8,683,462 B2 | 3/2014 | Goldman | |
| 8,732,530 B2 | 5/2014 | Ng | |
| 2002/0188742 A1 | 12/2002 | Nie | |
| 2003/0023839 A1* | 1/2003 | Burkhardt | G06F 9/4416 |
| | | | 713/1 |
| 2003/0120707 A1* | 6/2003 | Bogdan | G06F 8/71 |
| | | | 718/106 |
| 2003/0154470 A1 | 8/2003 | Applin et al. | |
| 2004/0030962 A1 | 2/2004 | Swaine et al. | |
| 2004/0123271 A1 | 6/2004 | Bindewald et al. | |
| 2004/0157593 A1* | 8/2004 | Lee | G06F 8/36 |
| | | | 455/418 |
| 2004/0230954 A1 | 11/2004 | Dandoy | |
| 2005/0097133 A1* | 5/2005 | Pham | G06F 8/61 |
| 2005/0120273 A1 | 6/2005 | Hudson et al. | |
| 2005/0190203 A1 | 9/2005 | Gery et al. | |
| 2006/0168587 A1 | 7/2006 | Aslam-Mir | |
| 2006/0174161 A1 | 8/2006 | Sharma | |
| 2007/0006150 A9 | 1/2007 | Walmsley | |
| 2007/0118530 A1* | 5/2007 | Chow et al. | 707/10 |
| 2007/0294710 A1* | 12/2007 | Meesseman | G06F 8/36 |
| | | | 719/328 |
| 2008/0141221 A1 | 6/2008 | Benesovska et al. | |
| 2009/0013309 A1* | 1/2009 | Shavlik | G06F 8/38 |
| | | | 717/120 |
| 2009/0019270 A1 | 1/2009 | Halter et al. | |
| 2009/0171484 A1* | 7/2009 | Birze | G05B 19/042 |
| | | | 700/86 |
| 2009/0171487 A1 | 7/2009 | Wilhelm | |
| 2009/0210747 A1* | 8/2009 | Boone et al. | 714/31 |
| 2009/0293043 A1* | 11/2009 | Begel et al. | 717/122 |
| 2009/0293118 A1* | 11/2009 | Yan | G06F 21/12 |
| | | | 726/19 |
| 2009/0320017 A1* | 12/2009 | Jackson | G06F 8/61 |
| | | | 717/174 |
| 2010/0153909 A1* | 6/2010 | Batey | G06F 8/36 |
| | | | 717/104 |
| 2010/0174974 A1 | 7/2010 | Brisebois et al. | |
| 2010/0199257 A1 | 8/2010 | Biggerstaff | |
| 2010/0242033 A1* | 9/2010 | Fritsch | G06F 8/65 |
| | | | 717/171 |
| 2010/0287525 A1* | 11/2010 | Wagner | 717/100 |
| 2011/0016356 A1 | 1/2011 | Artzi et al. | |
| 2011/0154305 A1 | 6/2011 | LeRoux et al. | |
| 2011/0185220 A1 | 7/2011 | Foley et al. | |
| 2011/0209008 A1* | 8/2011 | Arapov | 714/48 |
| 2011/0225074 A1* | 9/2011 | Khosravy | G06Q 10/10 |
| | | | 705/34 |
| 2011/0231361 A1 | 9/2011 | Patchava et al. | |
| 2011/0246964 A1 | 10/2011 | Cox et al. | |
| 2011/0289483 A1 | 11/2011 | Williams et al. | |
| 2011/0302556 A1 | 12/2011 | Drukman et al. | |
| 2011/0314438 A1* | 12/2011 | Surazski | G06F 11/0742 |
| | | | 717/100 |
| 2012/0042310 A1* | 2/2012 | Kannan | G06F 9/44526 |
| | | | 717/175 |
| 2012/0102483 A1 | 4/2012 | Goldman | |
| 2012/0102485 A1 | 4/2012 | Goldman | |
| 2012/0110559 A1 | 5/2012 | Dolinsky et al. | |
| 2012/0130801 A1* | 5/2012 | Baranov et al. | 705/14.43 |
| 2012/0260232 A1* | 10/2012 | Hirsch | G06F 8/20 |
| | | | 717/107 |
| 2012/0283852 A1 | 11/2012 | Birze et al. | |
| 2012/0317155 A1 | 12/2012 | Ogasawara et al. | |
| 2012/0317638 A1 | 12/2012 | Carrara et al. | |
| 2013/0007700 A1 | 1/2013 | Villar et al. | |
| 2013/0047138 A1* | 2/2013 | Radez | 717/121 |
| 2013/0054682 A1* | 2/2013 | Malik et al. | 709/203 |
| 2013/0074031 A1 | 3/2013 | Birze et al. | |
| 2013/0132933 A1 | 5/2013 | Hajaram et al. | |
| 2013/0332943 A1 | 12/2013 | Sun et al. | |
| 2014/0033183 A1 | 1/2014 | Brown | |

OTHER PUBLICATIONS

Integrated development environment, Wikipedia, Dec. 9, 2010, last retrieved from en.wikipedia.org/w/index.php?title=Integrated_development_environment&oldid=401386832, last retrieved Sep. 22, 2014.*

Safari Books Online, Programming Android, 2nd Edition, Chapter 1, "Installing the Android SDK and Prerequisites," Nov. 10, 2010, last retrieved from https://www.safaribooksonline.com/library/view/programming-android-2nd/9781449332921/ch01.html on Jun. 1, 2016.*

Abb, "Installation and Setup Guide WebWare SDK," Version 4.9 Revision A, 2008, last retrieved from https://library.e.abb.com/public/cce679f6d3d652d8c125766d003a4469/WW_SDK_4.9_manual.pdf on Oct. 19, 2016.*

Adobe, "Developer FAQ Adobe Acrobat SDK," Version 8.0, Nov. 2006, last retrieved from http://www.adobe.com/content/dam/Adobe/en/devnet/acrobat/pdfs/Acrobat_SDK_developer_faq.pdf on Oct. 19, 2016.*

Nuance Communications, Inc., "OmniPage 16 Capture SDK Quick Start Guide," 2009, last retrieved from http://www.coriumsoft.com/confluence/download/attachments/5996698/CSDK16_Quick_Start_Guide.pdf?version=1&modificationDate=1406564064999&api=v2 on Oct. 19, 2016.*

Battaglia et al., "An Open and Portable Software Development Kit for Handheld Devices with Proprietary Operating Systems," IEEE Transactions on Consumer Electronics, vol. 55, No. 4, Nov. 2009, pp. 2436-2444.*

Benso et al., "A Software Development Kit for Dependable Applications in Embedded Systems," Proceedings International Text Conference 2000, Oct. 3-5, 2000, pp. 170-178.*

Elding et al., Request for Comments: 2616 Hypertext Transfer Protocol—HTTP/1.1, Jun. 1999.

IBM Blueprints—"Configuring Remote Crash Dump on Linux Systems," XP055052042, Aug. 2009, 26 Pages.

PCT Notification of Transmittal of the International Search Report and the Written Opinion of the International Searching Authority, or the Declaration, Internatiional Searching Authority, International Application No. PCT/US2012/069074, mailed Apr. 2, 2013, 17 pages.

UNIX International, Programming Languages SIG, Revision 2.0, "DWARF Debugging Information Format," Jul. 27, 1993, Parsippany, NJ.

"Mobile Development Tips: Current mobile development trends in simple English," "Symbolication (or how to analyze Apple's crash logs) under the hood," Oct. 7, 2010, last retrieved from hhtps://myok12.wordpress.com/2010/10/07/symbolication-or-how-to-analyze-apples-crash-logs-under-the-hood/ on Apr. 27, 2015, 3 pages.

Fielding et al., Request for Comments: 2616 Hypertext Transfer Protocol—HTTP/1.1, Jun. 1999.

* cited by examiner

SYSTEM AND METHOD FOR AUTOMATIC SOFTWARE DEVELOPMENT KIT CONFIGURATION AND DISTRIBUTION

CROSS-REFERENCE TO RELATED APPLICATIONS

The present utility patent application claims priority from provisional patent application of common title, inventorship, and ownership, which is assigned Ser. No. 61/763,638 and filed on Feb. 12, 2013, and is also a continuation in part of U.S. patent application Ser. No. 13/567,262, filed on Aug. 6, 2012, which is a continuation in part of U.S. patent application Ser. No. 13/426,493, filed on Mar. 21, 2012, which is a continuation in part of U.S. patent application Ser. No. 13/323,166, filed on Dec. 12, 2011. The contents of each of these applications is hereby incorporated by reference.

BACKGROUND

Debugging is a process of finding and extracting bugs, errors and/or defects (hereinafter generally "bugs"), in a computer program, such as an application, thus making the application behave as expected by the application developer. Conventionally, developers have been primarily limited to debugging applications prior to those applications being distributed to end users for installation on an end user's mobile device, e.g., a smart phone, personal digital assistant (PDA), tablet computer, etc. With the growth of applications that may be provided to end users across the world (e.g., mobile applications), developers have limited ways of receiving information as to what may cause specific bugs in the applications, while the application is being utilized by the end user and executed on an end user's device.

Software developers commonly utilize one or more software development kits (SDKs) that are available from a variety of sources. SDKs may comprise a plurality of functions that may be linked into an application to provide certain functionalities that may be accessed by routines of the application. However, a noted disadvantage of SDKs is that they may include a number of functions and/or modules that are not needed for a particular application. These unneeded modules may significantly increase the size of the SDK. This may result in larger application sizes, which may be very disadvantageous in certain mobile device environments where memory may be limited. A further noted disadvantage of conventional SDKs is that a single SDK may not provide all of the required modules and/or functionality. In such cases, a plurality of SDKs may need to be linked into an application. The need to utilize a plurality of SDKs typically results in oversized applications.

SUMMARY

The present disclosure relates generally to SDKs and, more particularly, to providing a developer of an application with tools for use in an integrated development environment.

In general, in one aspect, the invention relates to a system and method for providing additional functionality in a developer side application associated with an integrated development environment ("IDE"). Specifically, the developer of the application may install analytic software, which may be embodied as a software development kit (SDK), on an IDE associated with the developer, wherein the analytic software may be installed with a wizard-like interface having a series of easy to follow instructions. The analytic software may be any type of software associated with a SDK, such as an advertising framework, or any other framework, as known by those skilled in the art. Illustratively, the analytic software is installed in a source code and/or binary format that may be integrated into the developer's source code for the application. During compilation and/or a build of the application, the analytic software is incorporated into the application. Once installed, the application, with the analytic software incorporated therein, may be provided and installed on a plurality of end user devices. Thereafter, the analytic software may work in conjunction with analytic processing logic to assist the developer in obtaining pertinent information related to bugs associated with the application that is being executed on the end user devices.

Illustratively, the developer analytic module executing at a developer's site provides a user interface (UI) to enable a developer to identify one or more types of modules to be integrated into the SDK to be installed at the developer's site. The analytic software communicates with a web server managed by an analytic service provider. The analytic service provider then generates an appropriate SDK comprising the selected modules for installation and on the developer's IDE. In an illustrative embodiment, the developer analytic module executing at the IDE periodically polls the analytic provider's web site for the most recent version numbers of the various component modules of the SDK. After receiving the latest version numbers, the developer analytic module determines whether newer versions of any of the modules exist, i.e. determines if the developer's IDE contains the most recent version of all modules. In response to determining that with the developer IDE does not contain the most recent version of all modules, the developer analytic module requests the most up-to-date versions be sent. In response, the analytic service provider web site generates the appropriate SDK and forwards it to the developer analytic module, which then installs it on the developer IDE.

BRIEF DESCRIPTION OF THE DRAWINGS

The embodiments herein may be better understood by referring to the following description in conjunction with the accompanying drawings in which like reference numerals indicate identically or functionally similar elements, of which.

DETAILED DESCRIPTION

A. Environment

A computer network is a geographically distributed collection of entities interconnected by communication links and segments for transporting data between end nodes, such as personal computers and workstations. Many types of networks are available, with the types ranging from Wi-Fi networks, cell phone networks, local area networks (LANs) to wide area networks (WANs). Wi-Fi is a mechanism for wirelessly connecting a plurality of electronic devices (e.g., computers, cell phones, etc.). A device enabled with Wi-Fi capabilities may connect to the Internet via a wireless network access point, as known by those skilled in the art. Cellular networks are radio networks distributed over land areas called "cells", wherein each cell may be served by at least one fixed-location transceiver known as a cell site or base station. When joined together, these cells may provide radio coverage over a wide geographic area. As known by those skilled in the art, this may enable a large number of portable transceivers (e.g., mobile phones) to communicate with each other. LANs typically connect the entities over dedicated private communications links located in the same general physical location, such as a building or campus. WANs, on the other hand, typically connect geographically dispersed entities over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between entities on various networks. The entities typically communicate over the network by exchanging discrete frames or packets of data according to predefined protocols, such as the Transmission Control Protocol/Internet Protocol (TCP/IP), Hypertext Transfer Protocol (HTTP). In this context, a protocol consists of a set of rules defining how the entities interact with each other and how packets and messages are exchanged.

Figure 1:
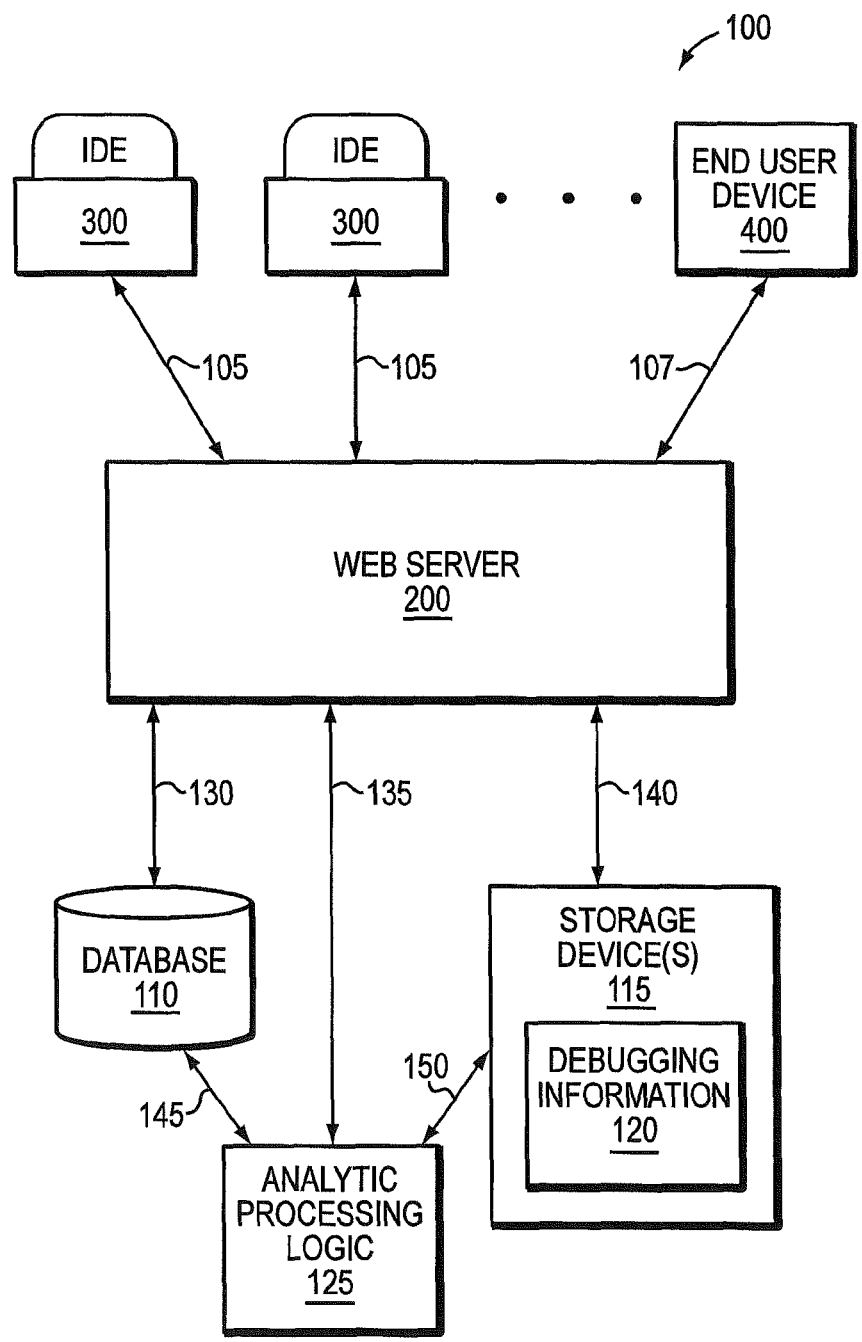
FIG. 1 is a schematic block diagram of an exemplary computing environment in accordance with an illustrative embodiment of the present invention.

FIG. 1 is a schematic block diagram of an exemplary computing environment 100 in accordance with an illustrative embodiment of the present invention. Specifically, the computing environment 100 may include one or more integrated development environments (IDE) 300 coupled to one or more web servers 200 (managed by an analytic service provider), interconnected by one or more communication links 105. Developer IDE 300, described further below in reference to FIG. 3, represents a development environment utilized by an application developer for creation of source code to be compiled, or otherwise built, to generate applications to be distributed for execution on end user device 400. Illustratively, IDE 300 may implement an Xcode® development environment. As known by those skilled in the art, Xcode® is a suite of tools for developing software on a Macintosh® (MAC) Operating System X® (OS), developed by Apple Inc®. While the present invention is described in relation to IDE 300 utilizing Xcode®, it should be noted that the teaching of the present invention may be utilized with any development environment. As such, all references to Xcode® and/or Mac OS® should be taken as exemplary only. Web server 200, described further below in reference to FIG. 2, is illustratively utilized to enable distribution of the analytic software to IDE 300, collection of data from IDE 300 and end user device 400, as well as provide proper message passing among the various entities in environment 100.

Further, end user device 400, database 110, analytic processing logic 125, and storage device(s) 115 may be coupled to web server 200 via communication link(s) 107, 130, 135, 140, 145, and 150, respectively. Storage device(s) 115 may for example store debugging information (e.g., dSYM file), among other data associated with the IDE 300 and end user device 400. End user device 400, described further below in reference to FIG. 4, may comprise any device capable of executing applications. Illustratively, end user device 400 may comprise a smart phone, a personal digital assistant and/or a tablet computer. Exemplary smart phones may utilize the Android® operating system, available from Google, Inc.®, and/or the iOS® system, available from Apple, Inc.® It should be noted that other smart phones may be utilized in alternative embodiments. As such, the description herein directed to development for iOS® systems should be taken as exemplary only.

It is noted that links 105, 107, 130, 135, 140, 145, and 150 are depicted in FIG. 1 as separate and individual links for simplicity purposes, and that communications between the devices may occur over a single link (e.g., Internet), a plurality of links, or virtual links as know by those skilled in the art. Moreover, one or more web servers 200, database 110, analytic processing logic 125, and storage device(s) 115 may all reside on a single device, or a plurality of devices, and managed by the analytic service provider. The devices are shown as separate entities in FIG. 1 for simplicity purposes. Further, those skilled in the art will understand that any number of devices and/or links may be used in the computer environment, and that the view shown herein is for simplicity.

Figure 2:
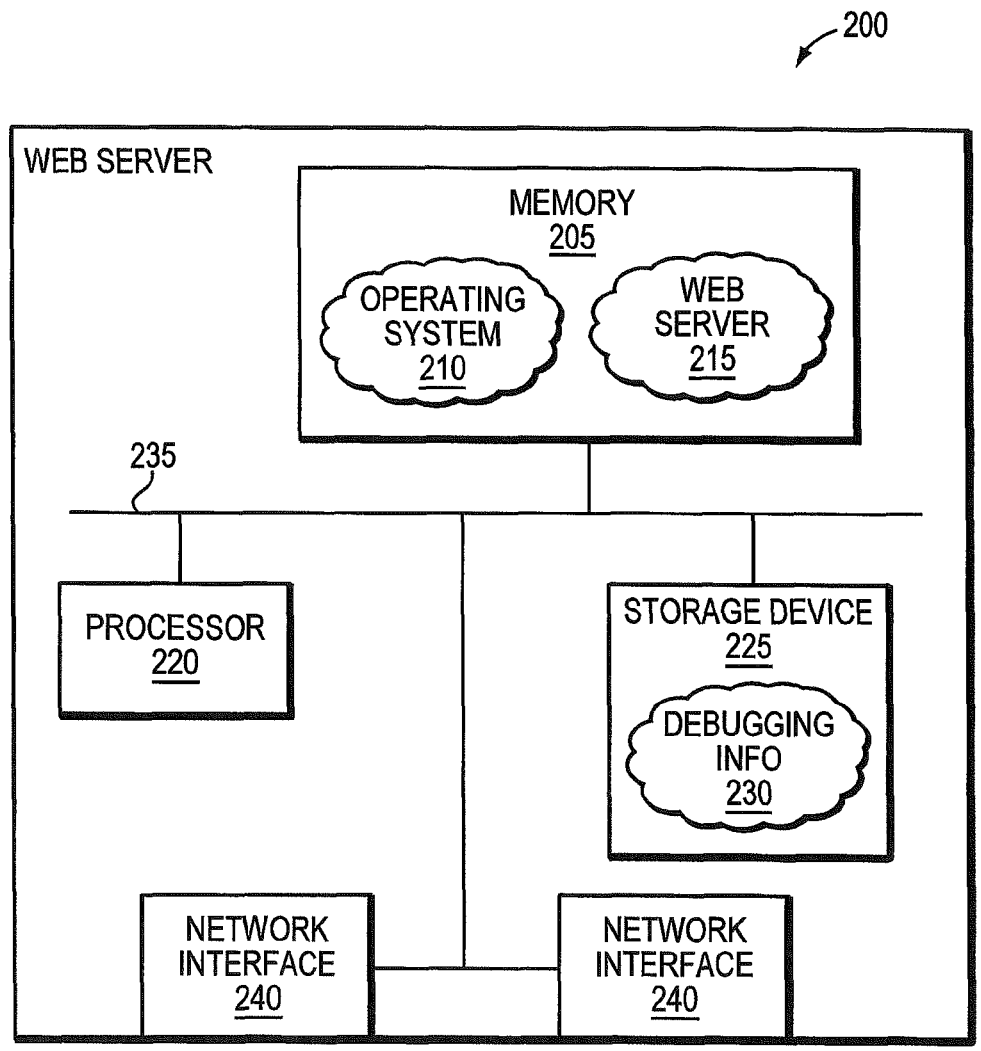
FIG. 2 is a schematic block diagram of an exemplary web server in accordance with an illustrative embodiment of the present invention.
Figure 3:
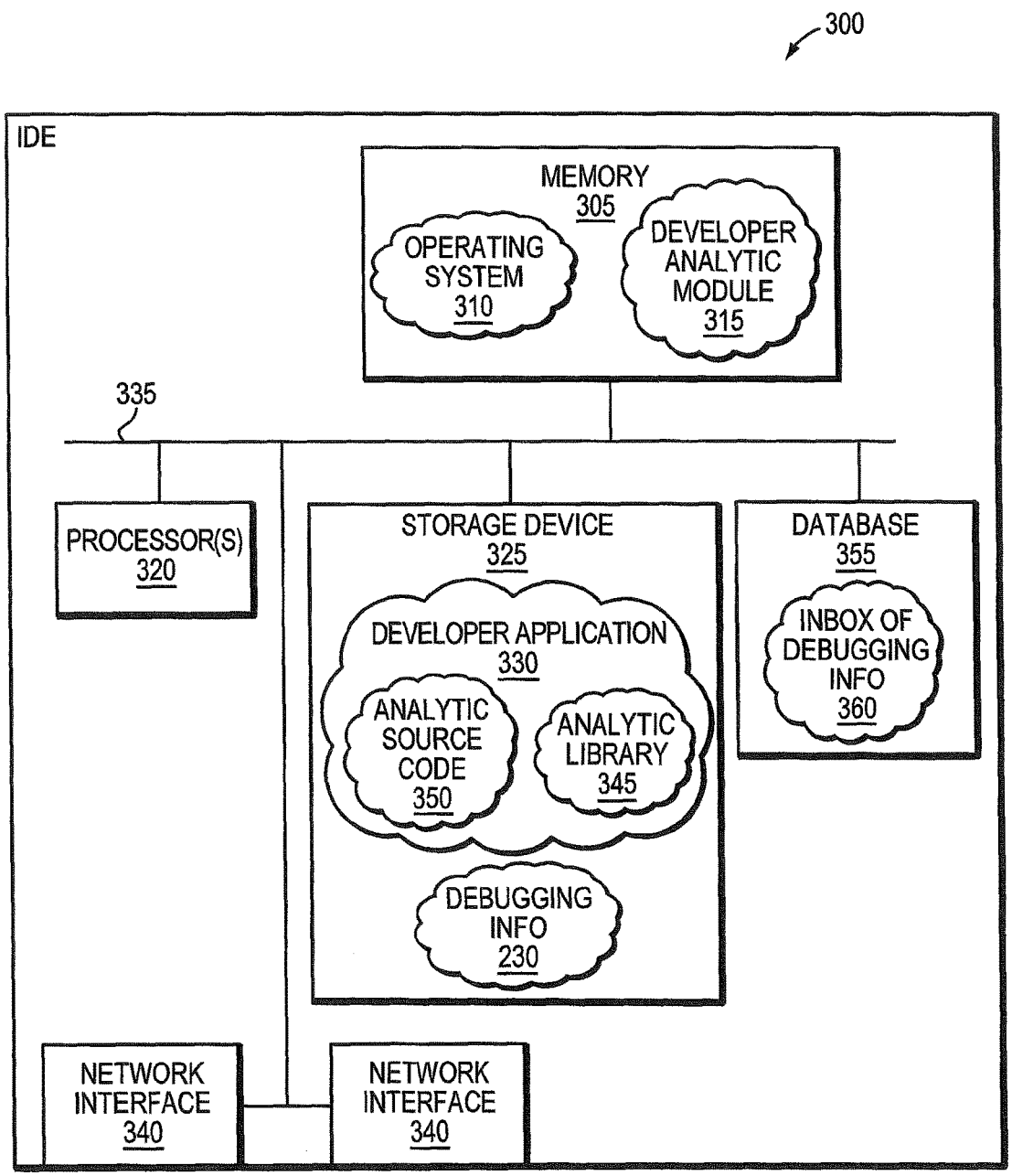
FIG. 3 is a schematic block diagram of an exemplary IDE in accordance with an illustrative embodiment of the present invention.

FIG. 2 is a schematic block diagram of an exemplary web server 200 in accordance with an illustrative embodiment of the present invention. The web server 200 may comprise a plurality of network interfaces 240, one or more processors 220, storage device 225, and a memory 205 interconnected by a system bus 235. The network interfaces 240 contain the mechanical, electrical, and signaling circuitry for communicating data over physical links coupled to a network, such as links 105, 107, 130, 135, 145, and 150 of FIG. 1. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 240 may also be used to implement one or more virtual network interfaces, such as for Virtual Private Network (VPN) access, known to those skilled in the art.

The memory 205 comprises a plurality of locations that are addressable by the processor(s) 220 and the network interfaces 240 for storing software programs and data structures associated with the embodiments described herein. The processor 240 may comprise necessary elements or logic adapted to execute the software programs and manipulate the data structures. An operating system 210, portions of which are typically resident in memory 205 and executed by the processor(s), functionally organizes the web server 200 by, inter alia, invoking network operations in support of software processes and/or services executing on the web server. A web server 215, portions of which are typically resident in memory 205 are executed by the processor(s), functionally store and execute logical commands inputted by the analytic service provider and developers. For example, web server 215 may implement a website managed by the analytic service provider, wherein developers may access that web site to obtain pertinent information associated with their applications and information associated with bugs incurred on the developers' application executing on an end user device. It should be noted that any system for distribution of the analytic software, collection of debugging information and crash data, etc. may be utilized. As such, the description of a web server should be taken as exemplary only. In alternative embodiments, the various functionalities may be distributed among a plurality of servers. As such, the description of a single web server 200 should be taken as exemplary only.

A storage device 225 may store debugging information 230, such as a dSYM file, that is sent, for example automatically, over the communication links from an IDE. Those skilled in the art will understand that a dSYM file may contain a plurality of mappings between memory offsets, such as addresses, and method names and line numbers associated with the built/compiled application created by the developer. The structure and information relating to a dSYM file and the functions associated therewith are well-known and described in more detail in "DWARF Debugging Information Format," dated Jul. 27, 1993, the contents of which are hereby incorporated by reference. It should be noted that in alternative embodiments, debugging information may be stored in differing formats other than dSYMs. For example, when developing for an Android® based end user device, debugging information may be stored in a well-known de-obsfuscation (de-ob) data container (file) such as that generated by the Proguard software that is available under the GPL. As such, the description of using dSYM files should be taken to be exemplary only. It will be apparent to those skilled in the art that other types of processors and memory, including various computer-readable media, may be used to store and execute program instructions pertaining to the techniques described herein. Also, while the embodiments herein are described in terms of processes or services stored in memory, alternative embodiments also include the processes described herein being embodied as modules consisting of hardware, software, firmware, or combinations thereof.

In an alternative embodiment, debugging information 230 may comprise one or more pre-organized SDKs, each of which may comprise a different combination of modules. In such an embodiment, a plurality of modules, each of which is illustratively directed to a different functional area, e.g. debugging, geo-location services, networking services, etc., may be organized in varying combinations to create various SDKs. A developer may utilize a user interface (UI) to select a desired combination of modules to be included in the SDK provided to the IDE. In one exemplary embodiment, the analytic service provider maintains a plurality of SDKs comprising the various combinations of modules. In an alternative embodiment, the analytic service provider maintains each module separately and dynamically combines them to create a SDK in response to a developer selecting various modules.

FIG. 3 is a schematic block diagram of an exemplary IDE 300 in accordance with an illustrative embodiment of the present invention. The IDE may comprise a plurality of network interfaces 340, one or more processors 320, a memory 305, a storage device 325, and database 355 interconnected by a system bus 335. The network interfaces 340 contain the mechanical, electrical, and signaling circuitry for communicating data over physical links coupled to a network, such as links 105, 107, 130, 135, 140, 145, and 150. The network interfaces may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 340 may also be used to implement one or more virtual network interfaces, such as for Virtual Private Network (VPN) access, known to those skilled in the art.

The memory 305 comprises a plurality of locations that are addressable by the processor(s) 320 and the network interfaces 340 for storing software programs and data structures associated with the embodiments described herein. The processor 340 may comprise necessary elements or logic adapted to execute the software programs and manipulate the data structures. An operating system 310, portions of which are typically resident in memory 305 and executed by the processor(s), functionally organizes the IDE by, inter alia, invoking network operations in support of software processes and/or services executing on the web server.

A developer analytic module 315, that is associated with the analytic service provider, portions of which are typically resident in memory 305 are executed by the processor(s), may functionally be installed onto IDE 300 by a user, such as a developer. The analytic module 315 may, for example, assist in gathering debugging information 230 associated with the developer's application on IDE 300. In accordance with various embodiments of the present invention, the developer analytic module 315 may perform various functions to aid in the development of applications by aiding the integration of the IDE with the analytic service provider. These various functions, described further below, help to ensure that the IDE is utilizing the most up to date SDK.

In accordance with an illustrative embodiment of the present invention, the developer analytic module 315 provides a user interface (UI) to the developer to enable the developer to select one or more modules to be included in the SDK provided by the analytic service provider.

A storage device 325 may store debugging information 230, such as a dSYM file, that is associated with application 330 of the developer. Further, storage device 325 may also store the application 330 of the developer that may be written and compiled on IDE 300 by a developer, for example. An analytic library 345 and analytic source code 350, that are associated with an analytic service provider, may be installed/incorporated within application 330 of the developer through use of an analytic installer, that is described in further detail with reference to FIG. 5.

Database 355, is illustratively configured to store an index of the debugging information 360 that may be gathered by developer analytic module 315. For example, database 355 may store an index of a URL of a dSYM file by an identifier, e.g., a universally unique identifier (UUID), associated with the debugging information 230. In an illustrative embodiment, database 355 may be implemented using the well-known SQLite database, however, it should be noted that in alternative embodiments any type of data structure that permits indexing, including, e.g., hash tables, etc., may be used. As such, the description of a database should be taken as exemplary only. Also, while the embodiments herein are described in terms of processes or services stored in memory, alternative embodiments also include the processes described herein being embodied as modules consisting of hardware, software, firmware, or combinations thereof.

Figure 4:
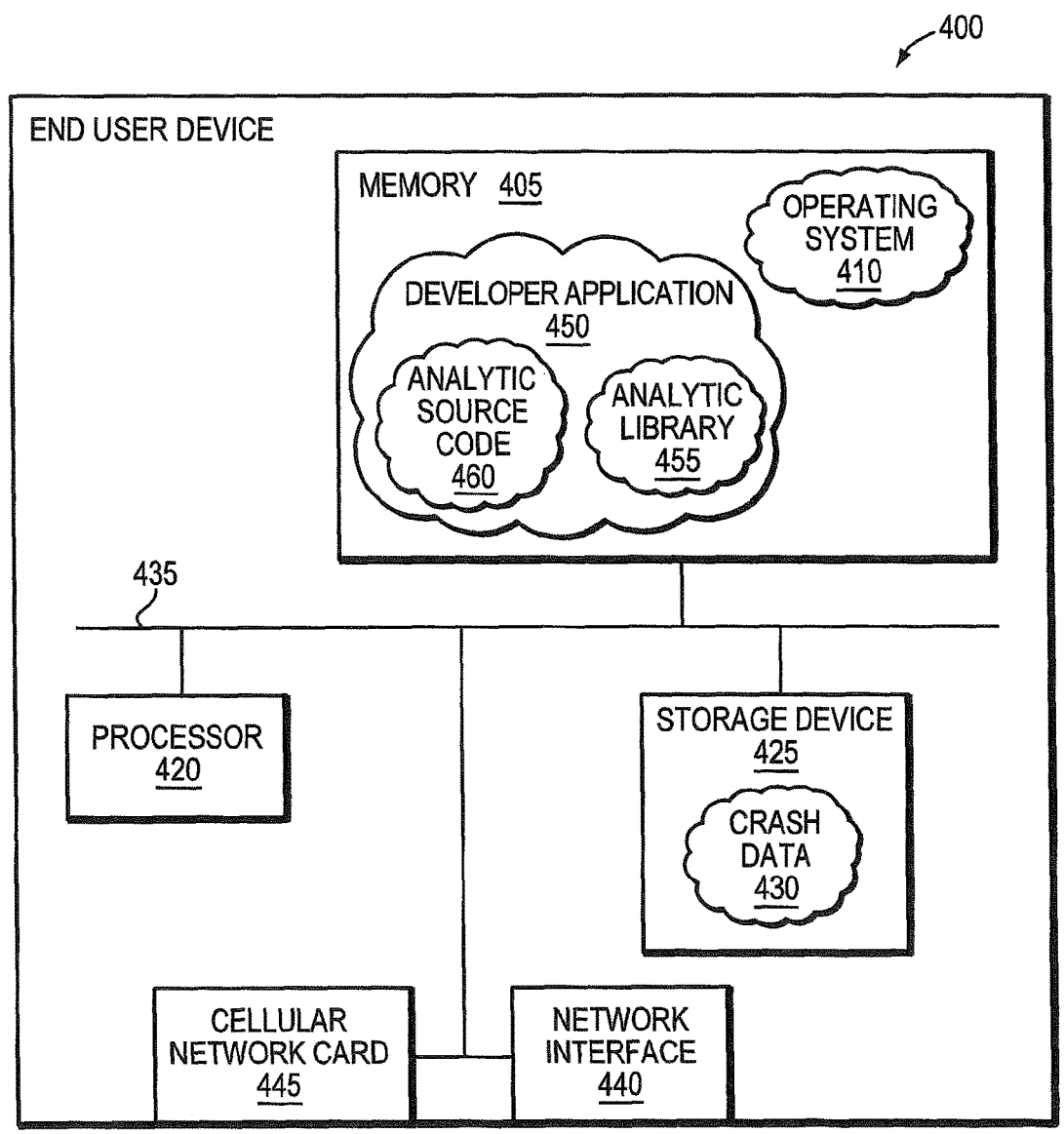
FIG. 4 is a schematic block diagram of an exemplary end user device in accordance with an illustrative embodiment of the present invention.

FIG. 4 is a schematic block diagram of an exemplary end user device 400 in accordance with an illustrative embodiment of the present invention. End user device 400 may comprise any device capable of executing applications. Illustratively, end user devices 400 may comprise a smart phone, a personal digital assistant and/or a tablet computer. Exemplary smart phones may utilize the Android operation system, available from Google, Inc.®, and/or the iOS® system, available from Apple, Inc.® It should be noted that other smart phones may be utilized in alternative embodiments. As such, the description herein directed to the development for iOS® systems should be taken as exemplary only. The end user device may comprise network interfaces 440, one or more processors 420, a memory 405, a storage device 425, and a cellular network card 445 interconnected by a system bus 435. The network interfaces 440 and cellular network card 445 contain the mechanical, electrical, and signaling circuitry for communicating data over physical links coupled to a network, such as links 105, 107, 130, 135, 140, 145, and 150 of FIG. 1. The network interface 440 and cellular network card 445 may be configured to transmit and/or receive data using a variety of different communication protocols, including, inter alia, TCP/IP, UDP, ATM, SONET, HTTP, wireless protocols, Frame Relay, Ethernet, Fiber Distributed Data Interface (FDDI), etc. Notably, a physical network interface 440 may also be used to implement one or more virtual network interfaces, such as for Virtual Private Network (VPN) access, known to those skilled in the art.

The memory 405 comprises a plurality of locations that are addressable by the processor(s) 420 and the network interfaces 440 for storing software programs and data structures associated with the embodiments described herein. The processor 420 may comprise necessary elements or logic adapted to execute the software programs and manipulate the data structures. An operating system 410, portions of which are typically resident in memory 405 and executed by the processor(s), functionally organizes the end user device by, inter alia, invoking network operations in support of software processes and/or services executing on the web server. An application 450, that may have been created by a developer on an IDE, and portions of which are typically resident in memory 405, are executed by the processor(s). Application 450 may be downloaded or installed on end user device 400 in any manner known to those skilled in the art. Further, application 450 includes analytic library 455 and analytic source code 460 that may have been incorporated within application 450 on IDE 300 by the developer. When the application 450 encounters a bug, crash data 430 associated with the bug and application (e.g., running processes, current RAM usage, IP address and network settings, physical orientation of the device in 3D space, among other aspects) may be created. Crash data 430 may be stored on storage device 425. Such storage devices may be non-volatile random access memory, flash, micro HD, etc. Also, while the embodiments herein are described in terms of processes or services stored in memory, alternative embodiments also include the processes described herein being embodied as modules consisting of hardware, software, firmware, or combinations thereof.

B. Installation of Analytic Software

Figure 5:
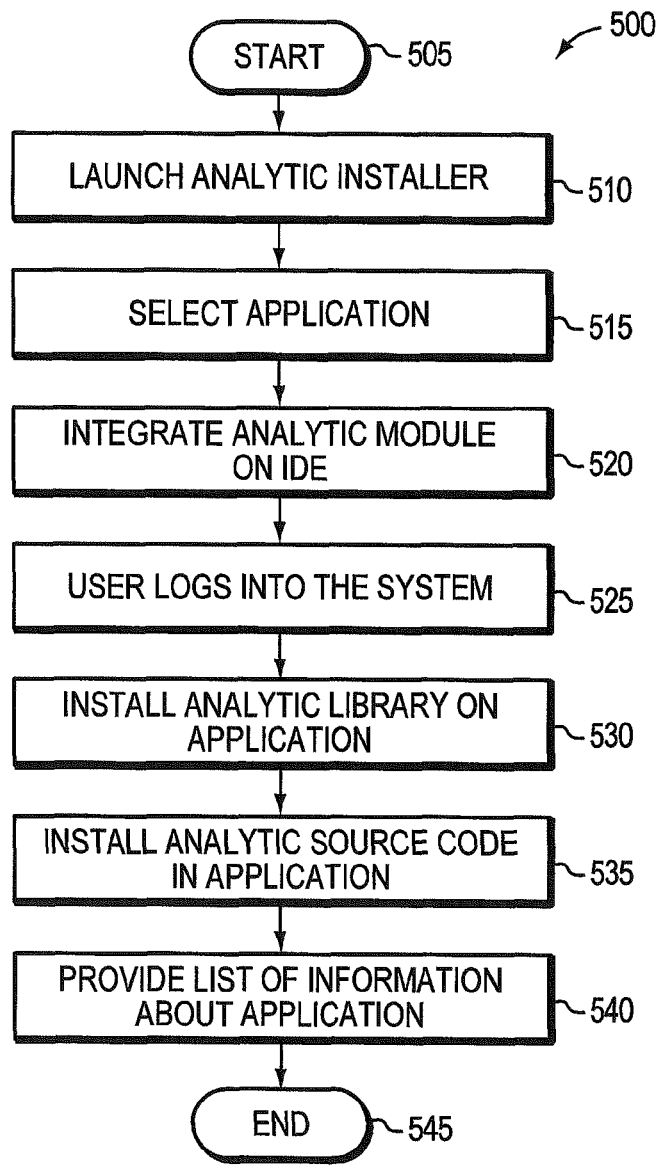
FIG. 5 is a flow chart detailing the steps of an exemplary procedure for installing the analytic software on an IDE in accordance with illustrative embodiment of the present invention.

FIG. 5 is a flowchart detailing the steps of an exemplary procedure 500 for installing analytic software, such as a software development kit ("SDK"), and the developer analytic module 315 on an IDE 300 in accordance with an illustrative embodiment of the present invention. It is noted that the SDK may be analytic software or any type of SDK, such as an advertising framework. Further, it is noted that the analytic software may be obtained in a variety of ways. For example, the analytic software may be downloaded on the IDE from a library (e.g., iTunes®), or downloaded from a website. The procedure 500 starts at step 505 and continues to step 510, where an analytic installer is launched. For example, the analytic software may be launched utilizing a GUI or a command line interface (CLI), as known by those skilled in the art.

After the analytic software is launched, a developer may select an application with which the developer wishes to incorporate the analytic software on in step 515. After an application has been selected in step 515, the procedure continues to step 520, where a developer analytic module may be integrated on the developer's IDE. The developer analytic module, for example, may assist in gathering debugging information on the IDE that is associated with the application on the developer's IDE. The developer analytic module, described above, provides added functionality to developers to aid in developing applications. Illustratively, the developer analytic module provides a user interface (UI), such as a graphical user interface (GUI) or a command line interface (CLI), to the developer for selecting one or more modules to be included in the SDK to be installed on the IDE. An exemplary UI is shown and described in relation to FIGS. 6 and 7.

After the analytic module has been integrated in step 520, the procedure continues to step 525, where the developer may log into the system (e.g., web server 215 that is managed by the analytic service provider) so that the developer's activity and files/applications associated with the developer may be tracked. It is noted, that if the user logs in prior to integrating the analytic module, step 525 may be skipped.

Once the developer has logged in at step 525, the procedure continues to step 530, where the analytic library may be installed in the application selected by the developer (e.g., selected in step 515). In an illustrative embodiment, the analytic service provider identifies an SDK that includes the selected modules (from step 520). In an alternative embodiment, the developer analytic module generates a custom SDK by combining the selected modules. It should be noted that the description of the analytic service provider storing a plurality of SDKs with varying combinations of modules should be taken as exemplary only. Similarly, the description of the analytic service provider storing a plurality of modules that are dynamically combined into a SDK that is then provided to a developer should be taken as exemplary only. In a further alternative embodiment, the analytic service provider may store a plurality of SDKs that comprise commonly utilized combinations of modules, while also storing individual modules to enable the analytic service provider to dynamically create a customizable SDK with an uncommon combination of modules.

The procedure continues to step 535, where analytic source code may be installed in the application selected by the developer. At step 540, after the developer logs in the system, he may be provided, through a list, or by any other layout, information associated with applications associated with the developer, information associated with bug(s) incurred by the applications associated with the developer, and other information associated with the developer. The procedure 500 then completes in step 545.

C. Configuration and Distribution

In accordance with an illustrative embodiment of the present invention, the developer analytic model installed in the IDE provides novel functionality to aid in the development of applications. One novel function is providing a user interface (UI) to a developer to enable the developer to select one or more modules to be included within the SDK. In response to selecting the one or more modules, the developer analytic module transmits such selections to the analytic service provider. The analytic service provider illustratively generates the SDK by combining the selected modules into a single SDK before transmitting the SDK to the IDE. In accordance with an illustrative embodiment of the present invention, the developer analytic module routinely polls the analytic service provider's web site to obtain the most recent version numbers associated with each of the selected modules contained in the SDK. The web server responds to such a request with the most recent version identifier for each of the selected modules. If any of the modules have been updated, i.e., the developer analytic module on the IDE is utilizing an older/out of date version, the developer analytic module initiates a request for the web server to transmit the most recent SDK to developer analytic module. In response to receiving the request, the analytic service provider's web server generates or selects the appropriate SDK and transmits it to developer analytic module. Upon receipt by the developer analytic module, the SDK is stored to be incorporated into any future built applications.

Figure 6:
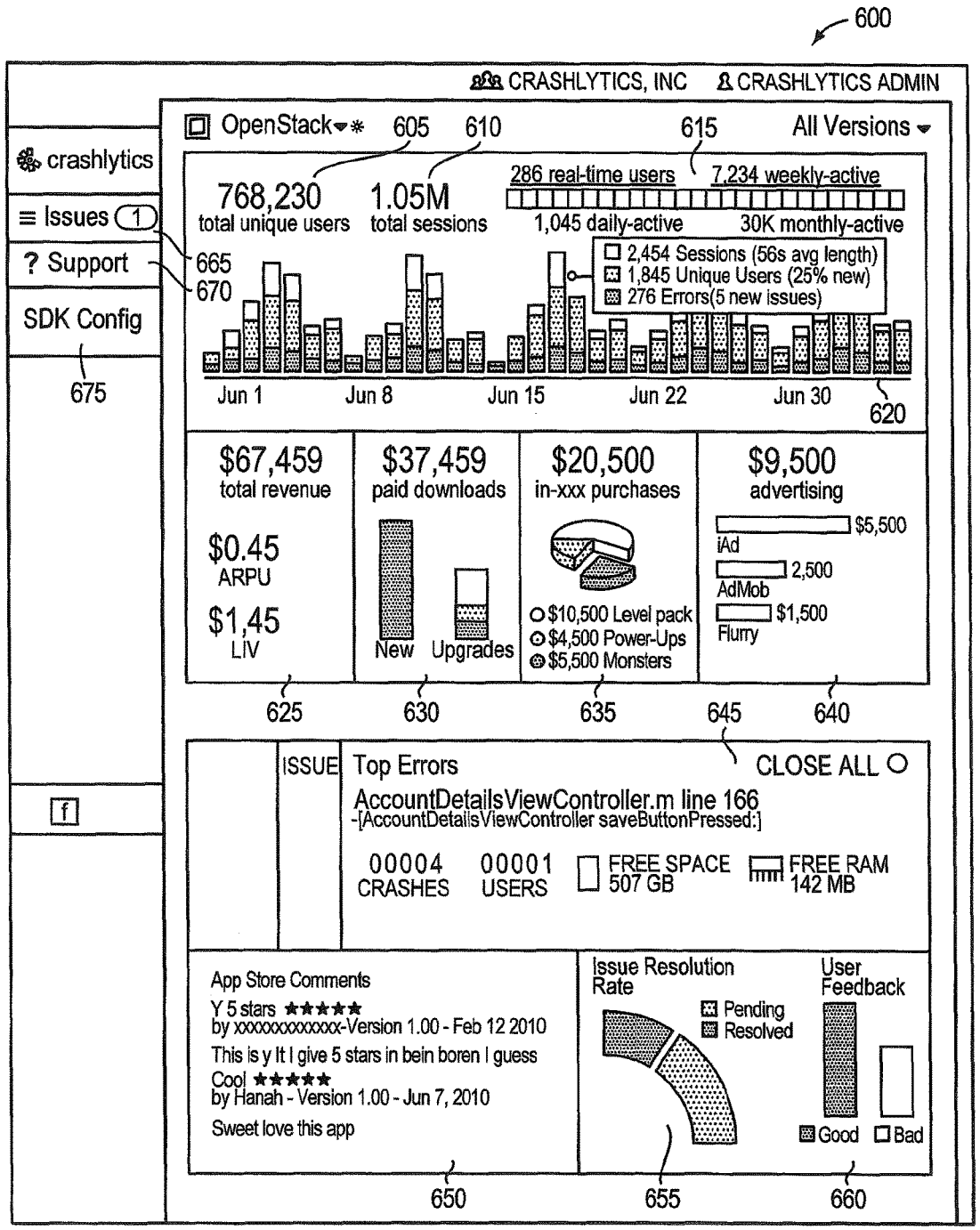
FIG. 6 is an exemplary graphical user interface (GUI) window displayed to a developer by the developer analytic module in accordance with illustrative embodiment of the present invention.

FIG. 6 is a screenshot of an exemplary graphical user interface window 600 displayed by the developer application module in accordance with an illustrative embodiment of the present invention. Window 600 illustratively displays an exemplary dashboard that the developer application module generates for a developer in order to provide high level overview of certain data associated with a particular application. The GUI window 600 illustratively comprises a plurality of fields of data that may be displayed in a variety of ways including, e.g., numerically, via bar chart, a pie chart, text block, etc. As such, the description of any particular field should be taken as exemplary only.

A total unique users field 605 displays the total number of unique users of an application. A unique user illustratively comprises a user that has installed the application on an end user device. Illustratively, if a user installs the application on a plurality of end user devices, e.g., both an iPhone and an iPad, the user is only counted once for the purpose of determining unique users. However, the developer analytic module may record the number of unique devices that an application is installed on and may, in alternative embodiments, display the total number of unique devices. The total sessions field 610 displays the total number of times that the application has been started. A user bar graph 615 provides information about the number of users who are currently using the application, who have used the application today, in the past week and within the past month.

A sessions bar chart 620 provides information relating to historical usage of the application. Bar chart 620 provides a day by day graph of, e.g., the number of times an application was utilized, the number of unique users and the number of errors encountered. This enables a developer to see trends over time in number of sessions invoked as well as number of error occurrences. The central part of window 600 displays various financial statistics. Exemplary field 625 displays a total revenue amount, while fields 630, 635 and 640 break down the total revenue by showing the amount generated by paid downloads 630, in-application purchases 635 and advertising 640.

A top errors field 645 displays various information relating to the top errors associated with the application. Illustratively, the field 645 displays the module and line where the error occurred, a number of times that a crash occurred because of this error, the number of users affected and diagnostic information relating to the devices on which the crashes have occurred.

A comments field 650 displays comments received from an application store, such as the iTunes® store provided by Apple, Inc.® The comments field 650 displays both the ratings received by an application, e.g., either numerically or via a star based rating, as well as text comments associated with the application in the application store. An issue resolution rate chart 655 displays the percentage of issue that have been resolved and/or are currently pending. Finally, a user feedback bar chart 660 displays the percentage of user feedback that is either positive or negative.

A series of tabs 665, 670 and 675 identify various sub pages that may be displayed. Illustratively, tab 665 is utilized to display issues associated with a particular application. In the exemplary window 600, the issues tab 665 has been selected. As such, window 600 is displaying information related to issues associated with a particular application. Tab 670 is utilized to display a support window (not shown). Tab 675 is utilized to cause the developer application module to display an SDK configuration window 700 (shown below and discussed in relation to FIG. 7) that enables a developer to select which modules should be included in the SDK.

It should be noted that the layout and fields displayed in window 600 are for illustrative purposes and that, as one skilled in the art will appreciate, variations in layout, changes in the number and/or types of fields displayed as well as the types of data displayed may be modified without departing from the spirit and scope of the invention. As such, the description of GUI window 600 should be taken as exemplary only.

Figure 7:
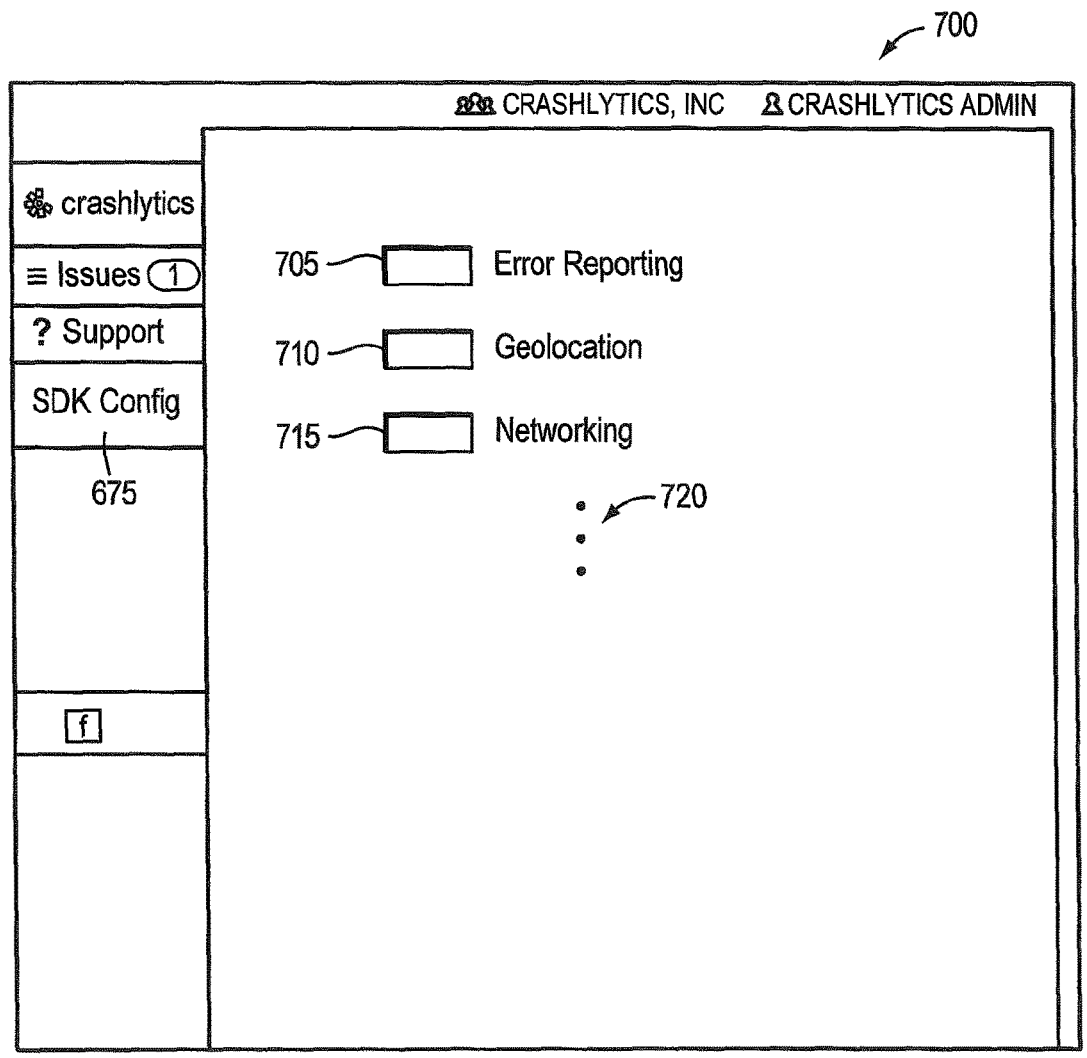
FIG. 7 is an exemplary GUI window displayed to a developer in accordance with illustrative embodiment of the present invention.

FIG. 7 is an exemplary graphical user interface window 700 and that may be displayed to a developer in accordance with an illustrative embodiment of the present invention. The window 700 may be displayed when a user selects the SDK configuration tab 675 from the GUI displayed by the developer analytic module. In accordance with an illustrative embodiment of the present invention, the developer application module permits a user to select one or more modules to be integrated into the SDK that is obtained from analytic service provider's web site. Window 700 illustratively contains a list of modules and check boxes that may be selected to indicate a developer's desire to include such functionality in the SDK. Illustratively, window 700 displays a checkbox 705 for error reporting, a checkbox 710 for geo-location services and a checkbox 715 for networking services. Additionally, additional check boxes 720 may be displayed in alternative embodiments of the present invention. In operation, a user may select one or more modules, via the GUI, that will be integrated into the SDK prior to installation on the IDE.

Figure 8:
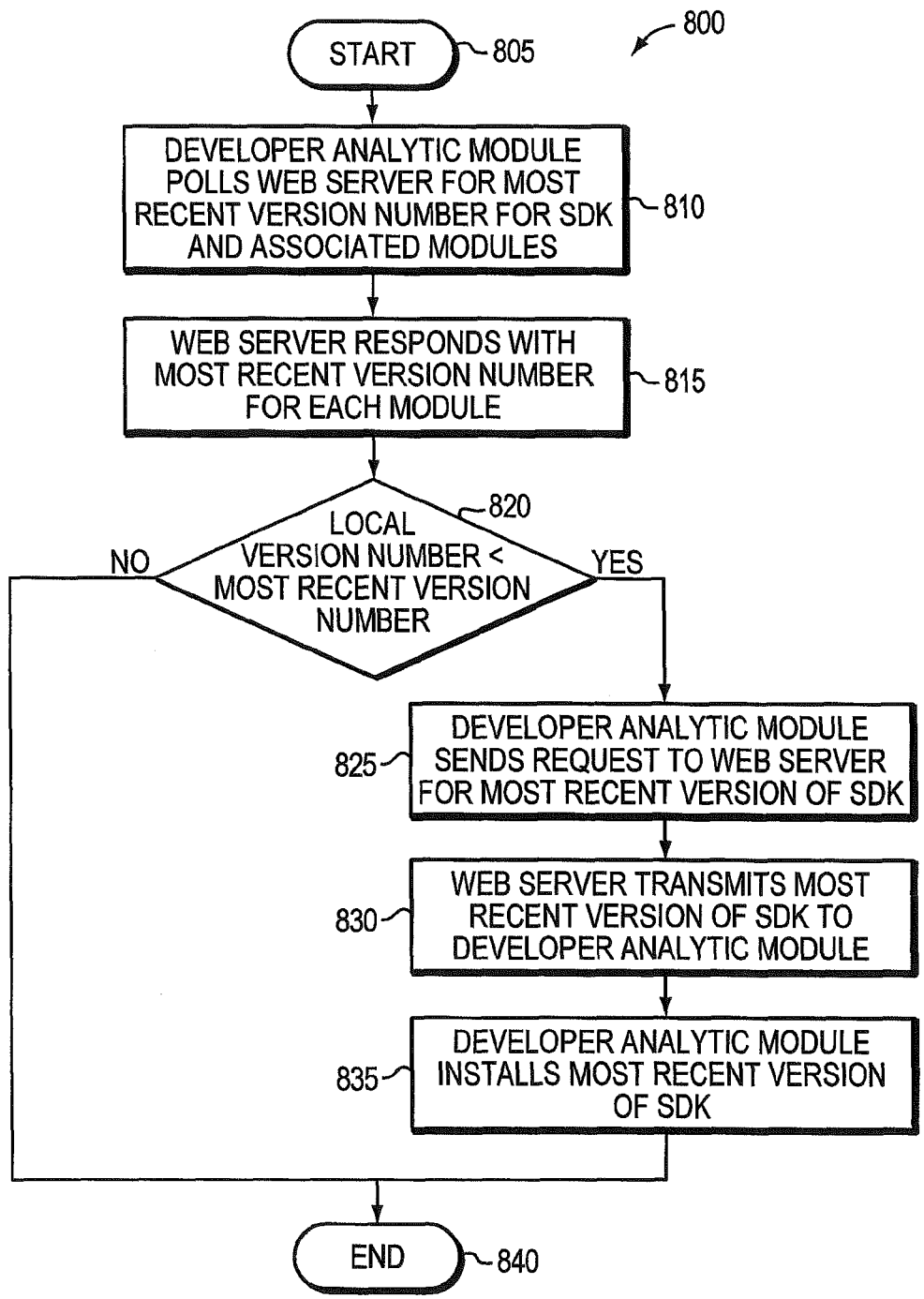
FIG. 8 is a flow chart detailing the steps of a procedure for a developer analytic module to obtain a most recent version of a software development kit (SDK) in accordance with illustrative embodiment of the present invention.

FIG. 8 is a flow chart detailing the steps of a procedure 800 for automatically updating a SDK to the most recent version in accordance with an illustrative embodiment of the present invention. The procedure 800 begins in step 805 and continues to step 810 where the developer analytic module polls the web server for a most recent version number for the SDK and the associated modules contained therein. As will be appreciated by one skilled in the art, any unique identifier may be utilized to identify different versions of an SDK and its constituent modules. As such, the use of the term version number should be taken as exemplary only. This polling may be performed on a routine basis or may be the result of user action. For example, the developer analytic module may poll the web server for a most recent version on a weekly basis. In alternative embodiments, the developer analytic module may poll the web server in response to a developer issuing a command to the developer analytic module. As such, the description of the developer analytic module automatically polling the web server should be taken as exemplary only.

Then, in step 815, the web server responds with a most recent version number for each constituent module of the SDK. Illustratively, as will be appreciated by those skilled in the art, each version of a module is assigned a unique version number, e.g., version 1.0, version 1.01, etc. As the SDK is maintained and generated by the analytic provider that hosts the web server, the web server has knowledge of the most recent version. The most recent version number is forwarded to the developer analytic module by the web server in step 815.

Upon receiving the most recent version number(s), the developer analytic module then, in step 820, determines whether its local version number is less than the most recent version number. That is, the developer analytic module determines whether or not it contains the most recent version of each of the modules in the SDK. More generally, the developer analytic module determines whether it has the most recent version of each module comprising the SDK. In alternative embodiments, the various versions may not utilize a version number. In such alternative embodiments, the developer analytic module, in step 820, determines whether the local version identifier is different from the identifier of the most recent version of the module. If the two identifiers differ, then the developer analytic module knows that the version stored locally is not the most recent version. If the developer analytic module determines that it contains the most recent version number, the procedure 800 then branches to step 840 and completes.

However, if in step 820, it is determined that the local version number is less than the most recent version number, the procedure 800 branches to step 825 where the developer analytic module sends a request to the web server for the most recent version of the SDK. In response to receiving the request, the web server transmits the most recent version of the SDK to the developer analytic module in step 830. As used herein, the most recent version of a SDK comprises a SDK that includes the most recent version of each of the modules that the developer has selected. Upon completion of the transfer, the developer analytic module then installs the most recent version of the SDK in step 835 before the procedure 800 completes in step 840. Procedure 800 ensures that on a regular basis, the SDK will be updated to include the most recent version comprising the most recent versions of each of the constituent modules.

It should be noted that the various descriptions and embodiments described herein are exemplary only. The aspects of the invention may be implemented in software, such as a non-transitory computer readable medium, hardware, firmware or any combination thereof. For example, a non-transitory computer readable medium can be configured with instructions to perform one or more of the steps of the flow charts described with regard to FIGS. 5 and 8. Further, while this description is written in reference to particular operating systems and/or IDEs, one skilled in the art will appreciate that the functionality may be implemented in differing environments. As such, the description of a MacOS environment should be taken as exemplary only.

What is claimed is:

1. A system for generating a customized software development toolkit (SDK), the system comprising:
 a processor; and
 a memory coupled to the processor configured to execute a developer analytic module, the developer analytic module configured to communicate, via a computer network, to a server, wherein the developer analytic module is configured to:
  display a user interface that includes representations of a plurality of SDK modules each having a different functionality,
  receive, through the user interface, a selection of at least two SDK modules of the plurality of SDK modules,
  transmit identities of the at least two SDK modules to the server,
  receive, from the server and over the computer network, the at least two SDK modules,
  create a single customized SDK that includes the at least two SDK modules received from the server, and
  incorporate the single customized SDK into a user application to execute on an end user device.

2. The system of claim 1 wherein the developer analytic module is further configured to:
 poll the server to determine a current version of each of the at least two SDK modules, of the single customized SDK, stored on the server,
 determine that at least one of the at least two SDK modules included in the single customized SDK is not a most current version,
 receive, without user intervention, at least one updated SDK module in response to determining that the at least one of the at least two SDK modules included in the single customized SDK is not the most current version, and
 create an updated single customized SDK that includes the at least one updated SDK module.

3. The system of claim 1 wherein one or more of the plurality of SDK modules includes at least one of an error reporting module, a geo-location module, and a networking module.

4. A method for generating a customized software development toolkit (SDK), the method comprising:
 displaying, on a display device of a computer having a processor, a wizard including a sequence of dialog boxes that include representations of a plurality of SDK modules each having a different functionality;
 receiving one or more user inputs through use of the wizard to select at least two SDK modules of the plurality of SDK modules, wherein each of the at least two SDK modules has a selected functionality;
 receiving, over a computer network and from a server, the at least two SDK modules selected through use of the wizard;
 in response to receiving the at least two SDK modules from the server, creating, by the processor of the computer, a single customized SDK that includes the at least two SDK modules received from the server, and
 incorporating, by the processor, the single customized SDK having the at least two SDK modules into a user application that executes on an end user device.

5. The method of claim 4, further comprising:
 receiving software bug information from the end user device executing the user application that includes the single customized SDK;
 storing the software bug information in a storage repository of the computer; and
 providing, by a web interface, the software bug information on the display device.

6. A method for generating a customized software development toolkit (SDK), the method comprising:

receiving, on a computing device having a processor, a selection of a plurality of component SDK modules for inclusion in a customized SDK, wherein each of the plurality of component SDK modules has a different functionality;

downloading the plurality of component SDK modules from a server;

in response to downloading the plurality of component SDK modules, creating, by the processor, a single customized SDK that includes the different functionalities of the plurality of component SDK modules that are downloaded;

incorporating, by the processor, the single customized SDK into an application stored on the computing device and to execute on an end user device.

7. A non-transitory computer readable storage medium comprising program instructions for generating a customized software development toolkit (SDK), the program instructions configured to execute on one or more processors to enable the one or more processors to:

display, on a display device, a wizard including a sequence of dialog boxes that include representations of a plurality of SDK modules each having a different functionality;

receive one or more user inputs through use of the wizard to select at least two SDK modules of the plurality of SDK modules, the at least two SDK modules each having a selected functionality; and receive, over a computer network and from a server, the at least two SDK modules selected through use of the wizard;

in response to receiving the at least two SDK modules from the server, create a single customized SDK that includes the at least two SDK modules; and incorporate the single customized SDK into an application that executes on an end user device.

8. A non-transitory computer readable storage medium comprising program instructions for generating a customized software development kit (SDK), the program instructions to execute on one or more processors to enable the one or more processors to:

transmit, from a developer device to a server, a selection of a plurality of component SDK modules for inclusion in a single customized SDK, wherein each of the plurality of component SDK modules has a different functionality;

download, at the developer device, each of the plurality of component SDK modules from the server;

in response to downloading each of the plurality of component SDK modules, create, at the developer device, a single customized SDK that includes the different functionalities of each of the plurality of component SDK modules;

transmit, from the developer device to the server, a polling command to the server for a most recent version of each of the plurality of component SDK modules that makes up the single customized SDK;

download, at the developer device, at least one updated component SDK module that is a most updated version; and create, at the developer device, a single updated customized SDK that includes the at least the one updated component SDK module that is the most updated version, wherein the single updated customized SDK is integrated with an application to execute on an end user device.

9. The method of claim 6, further comprising downloading a new version of at least one of the plurality of component SDK modules.

10. The method of claim 9, further comprising creating, by the processor, a new single customized SDK that includes the new version of the at least one of the plurality of component SDK modules.

11. The method of claim 4 wherein one or more of the plurality of SDK modules includes at least one of an error reporting module, a geo-location module, and a networking module.

12. The method of claim 4, further comprising:

downloading a new version of at least one of the at least two SDK module; and creating, by the processor, a new single customized SDK that includes the new version of the at least one of the at least two SDK module.

13. The method of claim 6 wherein one or more of the plurality of component SDK modules includes at least one of an error reporting module, a geo-location module, and a networking module.

14. The method of claim 6, further comprising:

receiving software bug information from the end user device executing the application that includes the single customized SDK;

storing the software bug information in a storage repository of the computing device; and providing, by a web interface, the software bug information on the display device.

15. The system of claim 1 wherein the developer analytic module is further configured to:

receive software bug information from the end user device executing the user application that includes the single customized SDK; and display the software bug information on a display device.

16. The non-transitory computer readable storage medium of claim 7, wherein one or more of the plurality of SDK modules includes at least one of an error reporting module, a geo-location module, and a networking module.

17. The non-transitory computer readable storage medium of claim 7, wherein the instructions further enable the one or more processor to:

download a new version of at least one of the at least two SDK modules; and create an updated single customized SDK that includes the functionality of the new version of the least one of the at least two SDK modules.

18. The non-transitory computer readable storage medium of claim 8, wherein one or more of the plurality of SDK modules includes at least one of an error reporting module, a geo-location module, and a networking module.

19. The non-transitory computer readable storage medium of claim 7, wherein the instructions further enable the one or more processors to:

receive software bug information from the end user device executing the application that includes the single customized SDK;

store the software bug information in a storage repository; and provide, by a web interface, the software bug information on the display device.

20. The non-transitory computer readable storage medium of claim 8, wherein the instructions further enable the one or more processors to:

receive, at the developer device, software bug information from the end user device executing the application that includes the single customized SDK;

store the software bug information in a storage repository of the developer device; and provide, by a web interface, the software bug information on a display of the developer device.

* * * * *